United States Patent
Wilke

(10) Patent No.: US 10,605,390 B2
(45) Date of Patent: Mar. 31, 2020

(54) GEOTEXTILE

(71) Applicant: HUESKER SYNTHETIC GMBH, Gescher (DE)

(72) Inventor: Markus Wilke, Coesfeld (DE)

(73) Assignee: HUESKER SYNTHETIC GMBH, Gescher (DE)

( * ) Notice: Subject to any disclaimer, the term of this patent is extended or adjusted under 35 U.S.C. 154(b) by 147 days.

(21) Appl. No.: 15/556,117

(22) PCT Filed: Mar. 24, 2016

(86) PCT No.: PCT/DE2016/100146
§ 371 (c)(1),
(2) Date: Sep. 6, 2017

(87) PCT Pub. No.: WO2016/150435
PCT Pub. Date: Sep. 29, 2016

(65) Prior Publication Data
US 2018/0045348 A1    Feb. 15, 2018

(30) Foreign Application Priority Data

Mar. 26, 2015  (DE) .......... 10 2015 104 681

(51) Int. Cl.
| | |
|---|---|
| *F16L 31/02* | (2006.01) |
| *E02B 3/12* | (2006.01) |
| *F16L 31/00* | (2006.01) |
| *F16L 41/08* | (2006.01) |
| *B65B 3/04* | (2006.01) |

(52) U.S. Cl.
CPC .............. *F16L 31/02* (2013.01); *E02B 3/127* (2013.01); *F16L 31/00* (2013.01); *F16L 41/08* (2013.01); *B65B 3/04* (2013.01)

(58) Field of Classification Search
CPC . F16L 31/02; F16L 41/08; F16L 31/00; E02B 3/127; B65B 3/04

USPC ............................ 285/200; 405/302.6, 302.7
See application file for complete search history.

(56) References Cited

U.S. PATENT DOCUMENTS

| | | | |
|---|---|---|---|
| 3,534,987 A * | 10/1970 | Wallace | F16L 41/08 |
| | | | 285/200 |
| 7,891,914 B2 * | 2/2011 | Smallwood | E02D 17/202 |
| | | | 405/302.6 |
| 2007/0093776 A1 | 4/2007 | Schaefer | |

OTHER PUBLICATIONS

International Search Report of Corresponding International Application No. PCT/DE2016/100146.
English Translation of Preliminary Report on Patentability in Corresponding International Application No. PCT/DE2016/100146.

* cited by examiner

*Primary Examiner* — Greg Binda
(74) *Attorney, Agent, or Firm* — Robert W. Morris; Ojeiku Aisiku; Eckert Seamans Cherin & Mellott, LLC

(57) ABSTRACT

A geotextile tube connecting unit comprises a flange ring (20), a support ring (30), and connection means (22) for connection of the flange ring (20) to the support ring (30) while including the geotextile base fabric (10) in-between. The geotextile base fabric (10) is subdivided into at least two segments (14) in the area of the filling opening (11), each segment (14) being bent outwards over at least one welt element (12). The welt element (12) is interlockingly held in place on the flange ring (20) and/or on the support ring (30) on at least one contact edge.

8 Claims, 5 Drawing Sheets

GEOTEXTILE

BACKGROUND OF THE INVENTION

The invention relates to a geotextile tube connecting unit for insertion into, or connection of a flushing tube to, a filling opening in a geotextile base fabric or for insertion of the flushing tube therein. The unit comprises at least a flange ring, a support ring and connection means for the connection of the flange ring to the support ring, including the geotextile base fabric positioned therebetween.

Geotextiles are used in numerous fields of applications in civil engineering and engineering construction. Favorable properties are the high mechanical tensile strength and the permeability to water. This results in applications such as the dewatering of sludge, the shoreline stabilization or the use as a wave breaker in coastal protection. In these applications, very large, in particular tube-shaped, containers are formed from geotextiles, which are filled with a suspension through a filling opening via flushing tubes. The solids of the suspension sediment within the containers, and the water contained therein can escape through the geotextile wall. The ends of the flushing tubes are either inserted through a filling opening and are thus guided directly into the interior of the container or are provided with coupling means that are connected to compatible coupling means at the filling opening. With a container diameter of several meters, high hydrostatic pressures occur during filling that lead to high tensile stresses in the jacket. Although geotextiles are readily able to absorb these tensile stresses, the filling openings represent weak spots. In any case, it is necessary to guide the considerable tensile stresses in the geotextile around the filling opening and to prevent the geotextile from starting to and continuing to tear at the filling opening.

U.S. Pat. No. 8,088,117 B describes a tube connecting unit of the type in question for a flexible container. In this case, the filling tube is provided with a fixed neck at the end, which has a flange. A flange ring is placed around the filling opening in the textile fabric section. This can be connected on the one hand to the flange of the tube neck; on the other hand, it interacts with a support ring on the other side of the fabric section. Screws pass through openings in the fabric to connect the flange ring and the support ring to each other. To prevent the edge section of the fabric extending around the filling opening from being pulled out from the clamping between the flange ring and the support ring, supplementary elastomeric rings are provided, which are intended to reinforce the frictional clamping between the flange ring and the support ring. However, in view of the high tensile stresses in suspension-filled containers, the frictional clamping of the geotextile section can fail, with the fabric still being form-fittingly retained on the screws. Due to the high stress concentration at the screws, however, a tear in the geotextile would soon develop.

U.S. Pat. No. 6,623,214 B1 describes a geotextile tube being used in coastal protection and describes a repair kit with which already formed tears are to be caught and further tearing is to be prevented. A filling opening is not provided; rather, a cover is used as the counterpart to a flange ring. The flange ring and the cover are also connected to each other using screws that are inserted through openings in the fabric. The fabric is clamped between the flange ring and the cover; supplementary friction-increasing rings are provided here as well. This too has the disadvantage that the frictional attachment can fail, and that a form-fitting attachment via the screws leads to initial and then continued tearing because of the stress concentration at the openings in the fabric.

SUMMARY OF THE INVENTION

The problem addressed by the present invention is, therefore, to improve a geotextile tube connecting unit of the aforementioned type in such a way that even higher tensile stresses can be reliably absorbed and tearing of the geotextile at the filling opening is prevented.

According to the present invention, this problem is solved by a geotextile tube connecting unit wherein the filling opening is not cut free, but rather the fabric present there is divided into segments and turned over. For a circular filling opening, for example, pie-slice-like circular segments are formed. A keder element is inserted into the turned-over fold of the geotextile. The keder element is form-fittingly retained at an edge of the flange ring and/or the support ring located at the outer circumference, while the combination of the flange and support ring clamps the textile sections in the fold onto one another. The clamping there has the same effect as that in the prior art. If, however, the friction forces are not sufficient there, the geotextile will creep. However, unlike in the prior art, the creeping process causes the fabric to pull the keder element against the edge at which it is retained. This results in a new frictional connection between the abutment edge, the textile section and the keder element. At the same time, the textile section in the wrap around is pulled towards the keder element, such that considerable frictional forces arise here as well at the keder element via the wrap angle of the geotextile.

Thus, in the event of failure of the basic connection at the clamping between the flange ring and the support ring, the described mechanisms are applied and prevent further creep and stabilize the clamping around the filling opening.

Prefabricated elements that already have a textile stitch edge are suitable as a keder element. As an alternative to the use of a prefabricated keder element, a hem stitch can be provided in combination with an inserted rope, cable or the like. The functionality corresponds completely to the previously described keder element. For the sake of simplicity, below, reference will be made to the keder element. It is advantageous to assemble the flange ring and the support ring under tension of the geotextile in order to provide the abutment of the textile to the keder element and of the keder element to the abutment edge from the outset and thus to reinforce the clamping from the beginning.

At least three segments should be formed for a circular filling opening. The turn-over fold can be seen as a secant on an annular keder element, so that the fabric does not abut at the center of the turn-over fold to the same extent as at the outer sides. The larger the diameter, the more segments should thus be formed, so that the fold of the turn-over fold is correspondingly shorter and is more closely aligned with the circular shape of the keder element.

Also possible are polygonal ring and keder shapes, which have the advantage that each section in the polygon has a straight edge and thus corresponds exactly to the contour of the turn-over fold.

A ring-shaped element, which has at least one abutment edge facing the filling opening and on which the keder element that is looped by the fabric can rest, is designated as a flange ring. This can be the inner circumference of the flange ring, but may also be a different limiting edge, for example, on a groove in which the keder element is placed. This groove can either be arranged centrally within the cross-section of the flange ring or the support ring so that the keder element is completely concealed and is not visible from the outside or can also be open towards the inner edge. In the latter case, the keder element is not completely enclosed, but at least is no longer freely located within the clear cross-section within the rings and is thus largely protected against damage by a tube neck inserted through the filling opening.

An element that at least forms a counter-support to the flange ring on the other side of the fabric is designated as the support ring. Holes for accommodating the screws or threaded bores can be provided therein.

The support ring can also have an abutment edge, and it can even be identical to the flange ring in its cross-section, that is, it can be built by a second flange ring. In this case, the keder element can be arranged symmetrically with respect to the separating plane and is supported on both rings, so that a particularly uniform stress profile is achieved.

The screw connection of the flange ring to the support ring can be effected in various ways, as will be explained below with reference to the exemplary embodiments illustrated in the following drawings.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
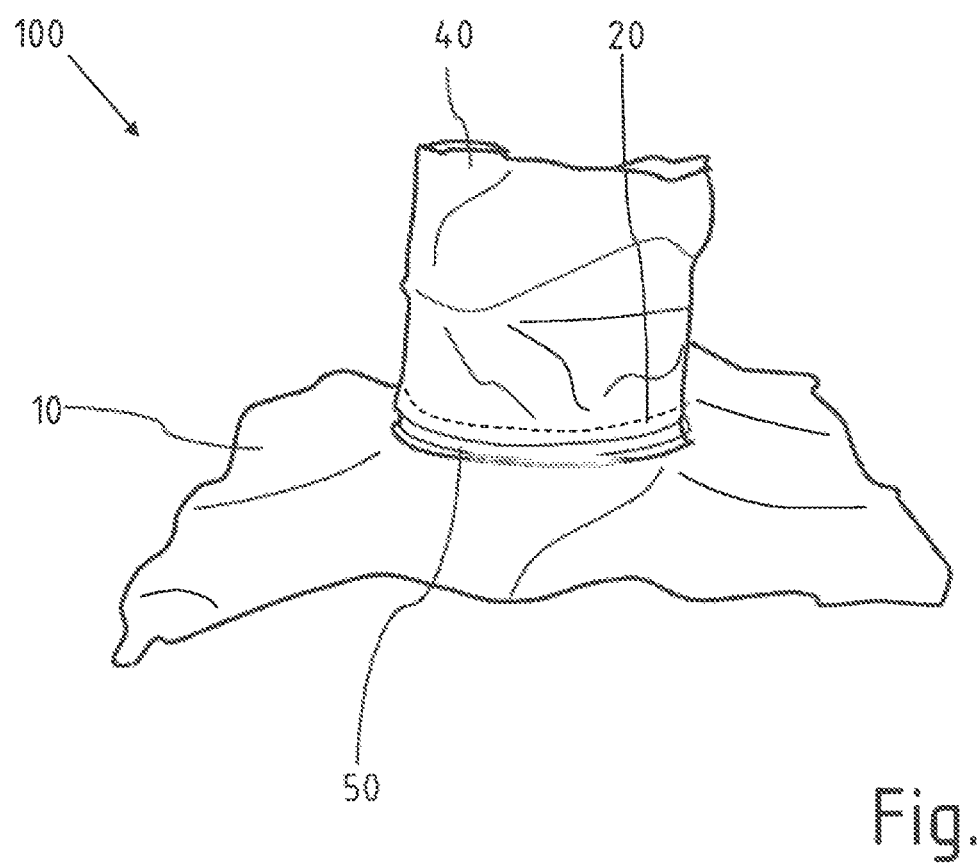
FIG. 1 shows a mounted geotextile tube connecting unit in a perspective view from the outside.

FIG. 1 shows a geotextile tube connecting unit 100 on a geotextile container, of which a section of a geotextile basic fabric 10 can be recognized. The geotextile tube connecting unit 100 comprises a flange ring 20 attached externally to the base fabric 10, which is covered here by a tube guide neck 40. The tube guide neck 40 is attached to the flange ring 20 by means of a clamp 50 and is also made of a geotextile. Its purpose is to facilitate the insertion of a flushing tube into the filling opening and to fasten the flushing tube thereon. To this end, the flushing tube can, for example, be secured using a tensioning belt that is placed around the tube guiding neck 40 or is interwoven therein.

Figure 2:
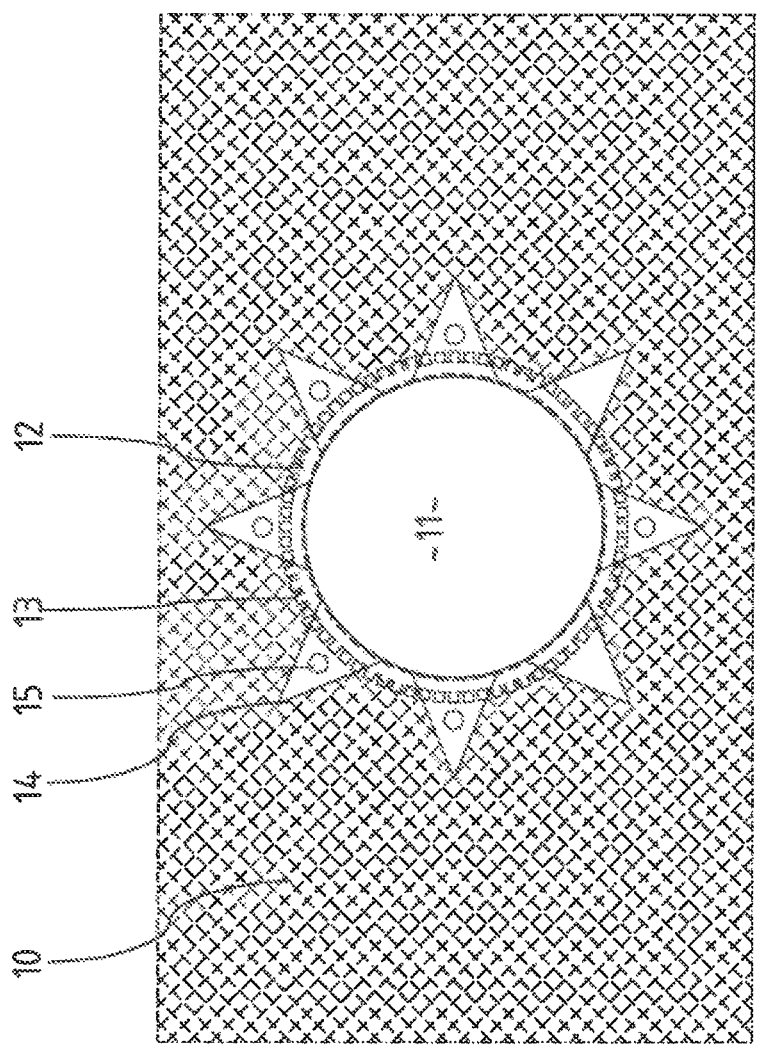
FIG. 2 shows a geotextile tube connecting unit according to a first mounting step in a top view.

FIG. 2 shows a partially mounted geotextile tube connecting unit 100. The filling opening 11 is already cut free forming a plurality of segments 14. These are each turned over to the outside onto the geotextile base fabric 10 and secured thereon by a seam 13, wherein each is guided around a keder element 12 with a wrap angle of 180° and more.

In the embodiment shown here, an opening 15 is introduced in each segment 14 and in the underlying base fabric 10, so that, for example a screw can pass through as a connecting means. The filling opening 11 is thus encompassed by the keder element 12, which is enveloped in the fabric 10.

Figure 3:
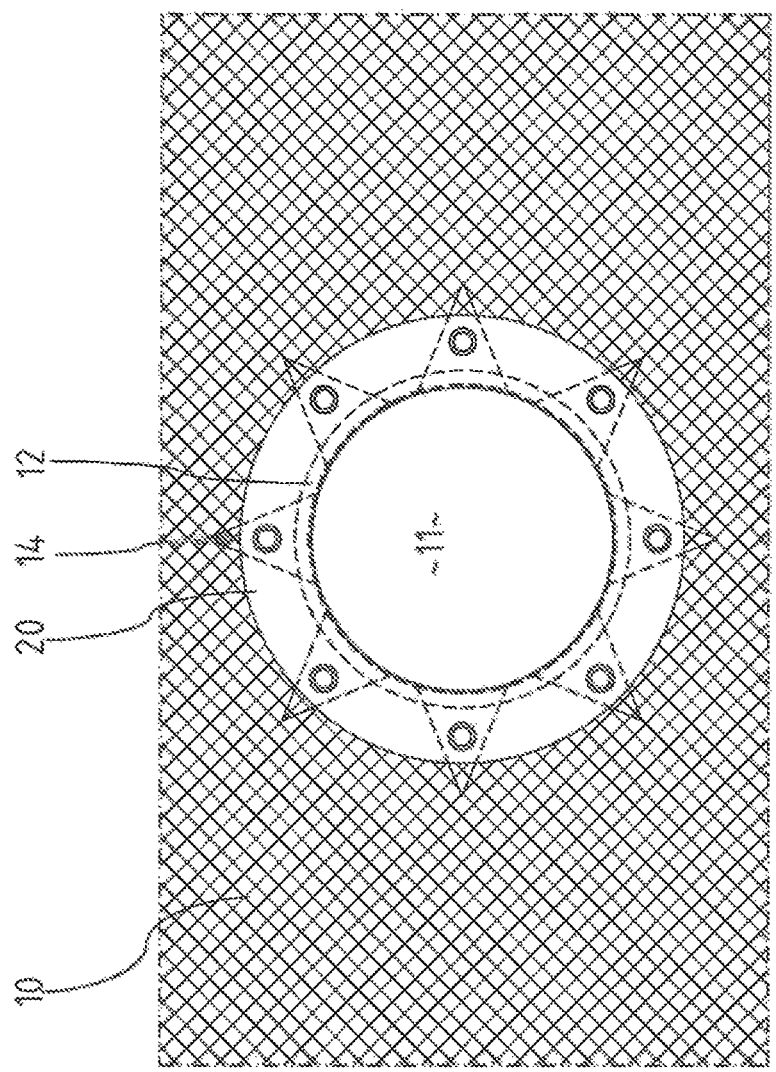
FIG. 3 shows a geotextile tube connecting unit according to a second mounting step in a top view.

In the illustration in FIG. 3, the flange ring 20 is placed onto the outer surface of the fabric 10 and now covers the keder element 12. Inside, the filling opening 11 is exposed. Screws establish a connection to a support ring, which is positioned on the opposite surface of the base fabric 10.

Figure 4A:
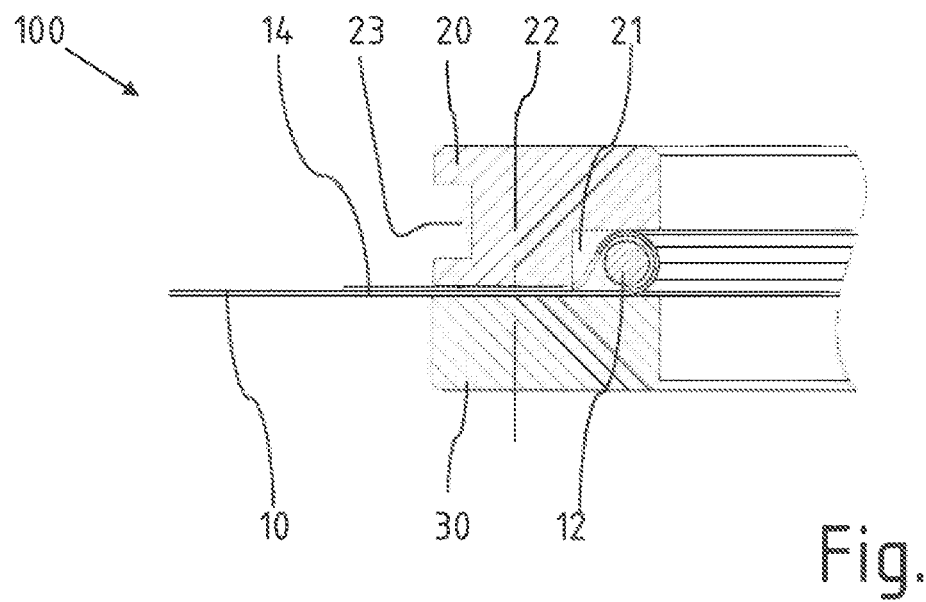
FIG. 4a shows a section of a geotextile tube connecting unit in accordance with various embodiments.

FIG. 4a shows a section through a first embodiment of a geotextile tube connecting unit 100. The transition of the base fabric section 10 into a segment 14 that surrounds the keder element 12 and is then clamped together with the base fabric 10 between the flange ring 20 and the support ring 30 can be recognized; the screw connection 22 is located on a partial circle outside the keder element 12. The keder element 12 is form-fittingly secured in a groove 21 (see FIG. 4a) of the flange ring 20 that is open toward the inner circumference. On the outer circumferential surface, a further groove 23 is introduced in order to secure the tube guide neck 40 therein by means of a tube clamp 50 or the like.

Figure 4B:
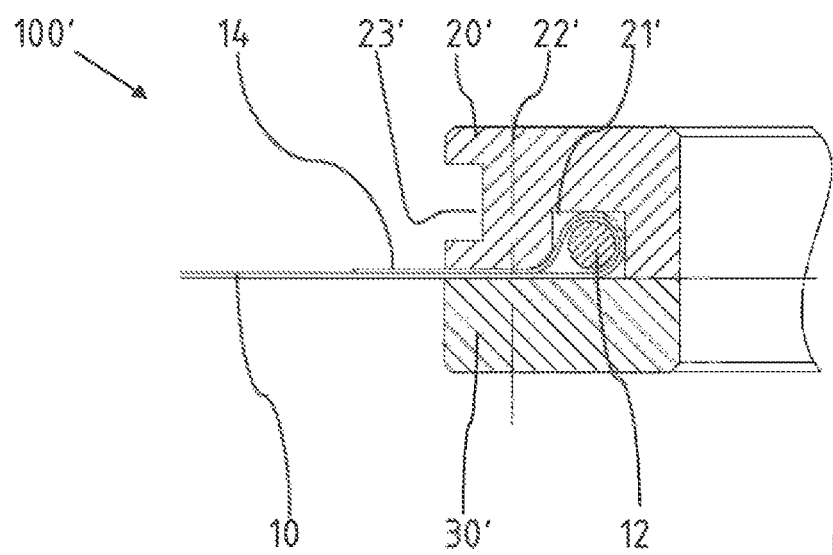
FIG. 4b shows a section of a geotextile tube connecting unit in accordance with various embodiments.

FIG. 4b shows a section through a geotextile tube connecting unit 100' according to a second embodiment. Here, a flange ring 20' is provided that has a groove 21' on its lower contact surface with the base fabric 10. An outer limiting edge in the groove 21' serves the abutment and the form-fitting securing of the keder element 12. The part of the flange ring 20' that extends beyond the groove 21' completely covers the keder element 12, so that the latter, together with the fabric sections 10, 14 that surround it, is better protected from mechanical abrasion by a tube neck inserted into the filling opening 11. The connection of the rings 20', 30 and the associated clamping of the segments 14 to the base fabric 10 is effected by means of a screw connection 22', which is arranged on a partial circle outside the keder element 12.

Figure 4C:
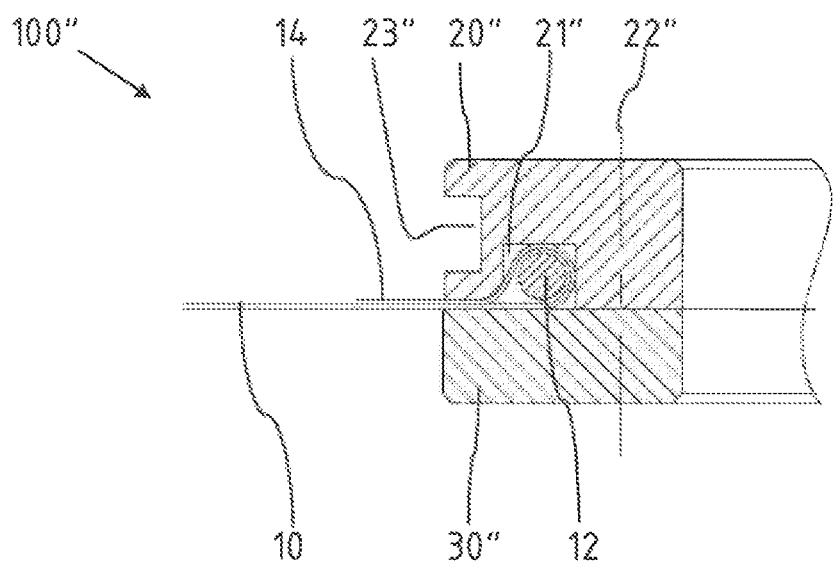
FIG. 4c shows a section of a geotextile tube connecting unit in accordance with various embodiments.

A third embodiment of a geotextile tube connecting unit 100" is shown in FIG. 4c. Again, a groove 21" for accommodating the keder element 12 is introduced into the flange ring 20" on the bottom side. However, this one is moved further outwards, whereas the partial circle for the screw connection 22" now lies within the annular keder element 12. This does reduce the clear opening of the filling opening 11 somewhat. However, the advantage of the screw connection 22" on the inside is that penetrations for passing through screws can be completely omitted in the base fabric 10 and in the segments 14 and material weakening is avoided.

Figure 4D:
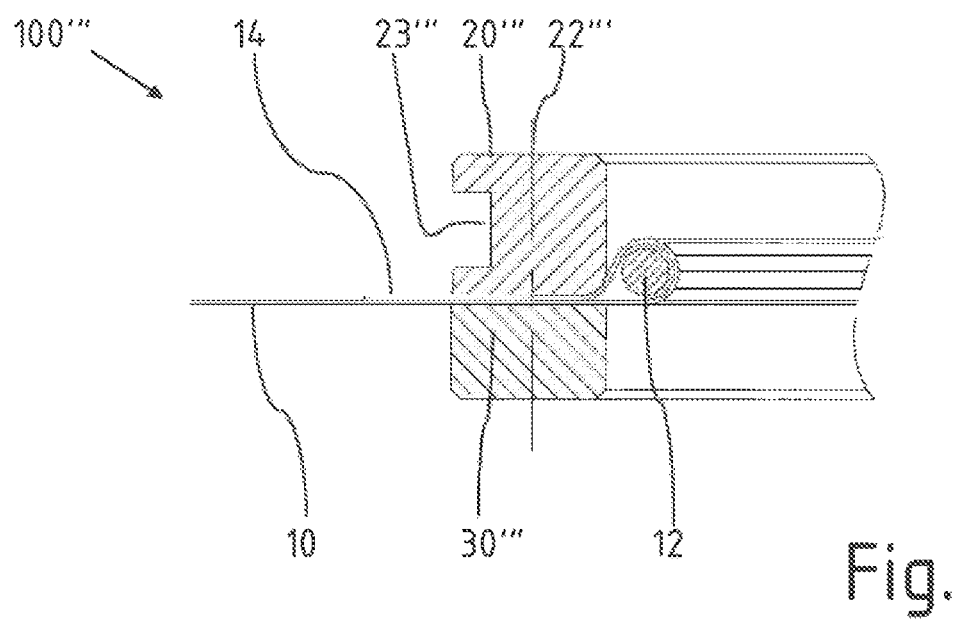
FIG. 4d shows a section of a geotextile tube connecting unit in accordance with various embodiments.

FIG. 4d shows a section through a fourth embodiment of a geotextile tube connecting unit 100'". The transition of the base fabric section 10 into a segment 14 that surrounds the keder element 12 and is then clamped together with the base fabric 10 between the flange ring 20'" and the support ring 30'" can be recognized. In the embodiment shown here, both the flange ring 20'" and the support ring 30'" are designed with a flat surface facing the fabric 10. The screw connection 22'" is located on a partial circle outside the keder element 12. The keder element 12 is located within the opening of the flange ring 20'" and is form-fittingly secured at the inner circumferential surface 24 of the flange ring 20. On the outer circumferential surface, a further groove 23'" is introduced in order to secure the tube guide neck 40 therein by means of a tube clamp 50 or the like.

There has thus been shown and described a novel geotextile connecting tube unit which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A geotextile tube connecting unit for insertion into or connection of a flushing tube to a filling opening in a geotextile base fabric or for insertion of the flushing tube therein, comprising a flange ring, a support ring and connection means for the connection of the flange ring to the support ring, including the geotextile base fabric located therebetween, the improvement wherein a filling opening fabric is cut free in the geotextile base forming a plurality of segments, each segment being turned over to the outside of the geotextile fabric in the region of the filling opening, each segment being turned over at least one keder element and wherein the keder element is form-fittingly secured on at least one abutment edge on at least one of the flange ring and the support ring.

2. A geotextile tube connecting unit as in claim 1, wherein all segments enclose a common, annular keder element.

3. A geotextile tube connecting unit as in claim 1, wherein the flange ring and the support ring are connected to each other via connecting means arranged outside the circumference of the at least one keder element and penetrating the geotextile base fabric.

4. A geotextile tube connecting unit as in claim 1, wherein the flange ring and the support ring are connected to each other via connecting means arranged inside the keder element.

5. A geotextile tube connecting unit as in claim 1, wherein the at least one keder element is arranged within at least one of the inner circumference of the flange ring and of the support ring and wherein the abutment edge is formed by the inner circumference of the flange ring or of the support ring.

6. A geotextile tube connecting unit as in claim 1, wherein the at least one keder element is arranged at least partially in a groove in at least one of the flange ring and in the support ring, and wherein the abutment edge is formed by a limiting edge of the groove.

7. A geotextile tube connecting unit as in claim 1, wherein a tube guide neck is attached to the flange ring.

8. A geotextile tube connecting unit as in claim 7, wherein the tube guide neck is formed from a geotextile fabric, and wherein the flange ring has at least one groove at its outer circumference into which engages a clamping ring for fastening the tube guide neck.

* * * * *